APPARATUS FOR CONTINUOUS CHROMATOGRAPHIC SEPARATIONS

Filed June 26, 1968 2 Sheets-Sheet 1

*INVENTOR.*
EDWIN J. TUTHILL
JAMES J. REILLY, JR.
Roland A. Anderson
Attorney

APPARATUS FOR CONTINUOUS CHROMATOGRAPHIC SEPARATIONS

Filed June 26, 1968 2 Sheets-Sheet 2

INVENTOR.
EDWIN J. TUTHILL
JAMES J. REILLY, JR.
BY [signature]
Attorney

United States Patent Office 3,482,376

Patented Dec. 9, 1969

3,482,376

APPARATUS FOR CONTINUOUS CHROMATOGRAPHIC SEPARATIONS

Edwin J. Tuthill, Belle Terre, and James J. Reilly, Jr., Bellport, N.Y., assignors to the United States of America as represented by the United States Atomic Energy Commission Filed June 26, 1968, Ser. No. 740,365
Int Cl. B01d *15/08*
U.S. Cl. 55—197 3 Claims

ABSTRACT OF THE DISCLOSURE

An apparatus for performing continuous chromatographic separations of mixtures of gases or liquids wherein the mixtures are continuously introduced into a packed slab shaped chamber having means for effectuating sequential laminar flow along the longest planes thereof in order to effect separation of the components on one of the planes thereof and simultaneously recovering the individual separated components as they emerge from the chamber.

Background of the invention

Chromatography has enjoyed widespread use as a means of separating the components of various chemical mixtures. It is employed both as an analytical tool and commercially as a means for separating out the product from a reaction mass.

A typical chromatographic set up includes a column packed with finely divided material and containing some type plug that allows liquid to pass through while retaining the packing. The column is first wetted with solvent, and then a concentrated solution of the sample to be chromatographed containing the mixture to be separated and solvent is introduced at the top of the column. After all of the sample has flowed into the packing, it is followed by solvent until all of the original sample has passed out of the column.

It has been obvious to those skilled in the art that such chromatographic methods have been greatly limited in their adaptability to commercial processes due to the requirement that they must be operated as batch type processes. The art has long sought a method of performing chromatographic separations wherein the separation can be carried out with a continuous stream operation.

It is an object of this invention to provide those skilled in the art with an apparatus which will permit continuous chromatographic separations to be carried out on mixtures of gases and liquids.

Summary of the invention

The invention described herein was made in the course of, or under a contract with the U.S. Atomic Energy Commission.

An apparatus capable of continuously separating the chemical components of a mixture of chemical species by a chromatographic technique comprising: a slab shaped chamber filled with particulate chromatographic adsorption material having a first axis and a second axis substantially larger than the third axis of the chamber; means for effectuating individual sequential laminar carrier fluid flows through said chamber along the first and second axes thereof without removing the adsorbent material therefrom; means for introducing a mixture containing at least two species, said species being capable of chromatographic separation; heating means operably connected to said chamber capable of regulating the temperatures of the adsorbent material; and means for selectively segregating specific portions of the carrier fluid as it exits from any point along the surface of the chamber so as to permit effective chromatographic separation of the species contained in the mixture.

Description of the preferred embodiment

Figure 1:
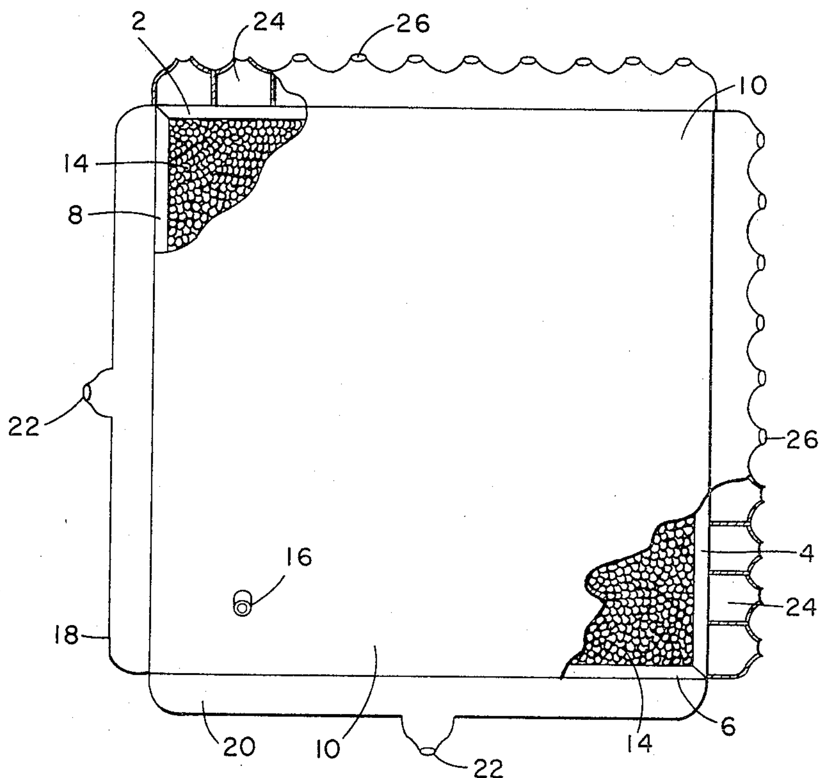
FIGURE 1 shows a partial cross-section and partial upper view of an apparatus constructed in accordance with this invention.
Figure 2:
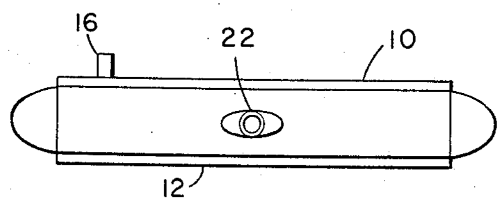
FIGURE 2 shows a side view of the device shown in FIG. 1.

FIGURE 1 shows a cross-sectional view of our novel apparatus which consists of a square shaped slab having four side walls—north 2, east 4, south 6, and west 8 together with a solid non-porous square shaped top 10 (FIGS. 1 and 2) and bottom 12 (FIG. 2) having a packed bed of particulate adsorbent material 14 contained therein. An orifice 16 (FIGS. 1 and 2) is connected to the bed material 14 and to the outside of the apparatus to permit continuous introduction of mixtures which are to be separated by our novel apparatus.

The north 2, east 4, south 6 and west 8 walls of the chamber are composed of a porous material to permit the flow of carrier fluid evenly through the wall into and out of the bed material 14, and to confine the bed material.

Individual manifolds 18 and 12 fitted to the external surfaces of the south 6 and west 8 walls, and said manifolds have carrier inlet orifices 22 which permit the introduction of carrier fluid evenly through the porous walls of the south 6 and west 8 walls of the chamber containing the bed material 14.

The external surfaces of the north 2 and east 4 walls of the apparatus are divided into a multiplicity of separate plenum chambers 24, which permit segregation of the effluent passing out of the bed with respect to the surface area of a predetermined portion of the surface of the walls (2+4) which they are connected with. Each plenum chamber 24 has a separate orifice 26.

In operating the mixture which is to be chromatographically separated is introduced continuously into the bed material 14 through orifice 16. The carrier fluid is sequentially introduced into the bed material 14 through either of the alternate west 8 or south 6 orifices 22 with suitable temperature variations for each sequence. When carrier fluid is introduced into the west orifice 22, the orifices (26 and 22) and the bed temperature is maintained at $T_1$ of the north plenum chamber (24) and the south manifold 20 are closed and thus the carrier fluid is directed from west to east across the adsorbent bed material. When the desired degree of transmigration of the materials to be separated on the east-west axis of the device is obtained, the orifices are suitably adjusted and bed temperature is changed to $T_2$ to obtain a flow of carrier fluid along the north-south axis until the desired degree of transmigration of the materials to be separated is obtained.

The eluate coming out of the column is collected fractionally and the components of the mixture will appear in different portions of the eluate provided that the components move through the column material at different rates.

The adsorbent material 14 can be heated by any conventional means such as heating coils embedded in the adsorbent material or by the application of heat from infra-red lamps to the external surfaces of the apparatus.

The adsorbent materials useful in the formation of the packed beds of our invention can be any of the conventional materials ordinarily employed in preparing conventional chromatographic columns, i.e., synthetic resins, paper, aluminum oxide particles, etc. It is to be understood that our invention is directed to a deployment of conventional chromatographic materials in a novel chromatographic method and apparatus.

Conventional carrier fluids (eluents) either gases or liquids can be employed in our novel apparatus, i.e., alcohol, oxygen, water, etc. The directional flow of carrier fluid through the bed can be accomplished by forcing the fluid through the bed with pressure or allowing it to fall through the bed by gravity thus allowing directional flow changes to be effectuated simply by reversing the vertical and horizontal axes of the slab by a 90 degree rotation of the slab.

The vector angle of separation for the components as they are transported through the adsorbent material should vary from each other by about 4° or more. This vector angle of separation will be enhanced by proper bed selection and by larger temperature differentials between the horizontal and vertical sequential flows of the materials through the bed.

The method essentially takes advantage of the change in the ratio of the chemical component velocities $V_n$ across an adsorbent bed, with temperature T, to resolve the components into individual product streams $$(V_A/V_B)_{T_1} \neq (V_A/V_B)_{T_2}$$

where $T_1 \neq T_2$.

With the adsorbent in the form of a rectangular slab, the feed mixture is introduced continuously into one corner and the flow direction of the carrier fluid is alternately changed (pulsed) at right angles with a change in temperature of the whole system.

In practice, when making a chromatographic separation, the carrier fluid flow is sequentially pulsed vertically and horizontally for a period ranging from several minutes to one half hour depending on the rate of transmigration of the components of the mixture through the adsorbent material while the mixture of the chemical species $A+B$ is continuously fed into the system. When the flow is vertical, (north-south), the temperature of the adsorbent bed is maintained at $T_1$, similarly when the flow is horizontal (east-west) the bed is maintained at $T_2$. The difference between the two temperatures would of course be dependent on the sensitivity of the transmigration of the components through the bed with respect to temperature. In ordinary systems, temperature differentials of about 30° C. are employed.

Let T=temperature, V=velocity of the chemical species through the bed of absorbent material, K=distribution coefficient at equilibrium which is the ratio of the concentration of a chemical species in the carrier fluid to the concentration in the fixed phase and $T_1 < T_2$.

Figure 3:
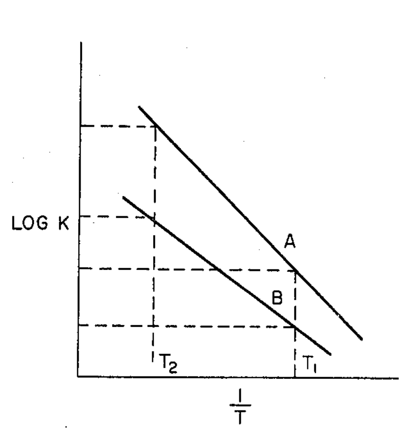
FIGURE 3 is a plot of the difference of the relative velocity of material being separated in the practice of this invention by plotting log $Kv1/T$.

The relationship of the distribution coefficient $K_n$ to the velocity $V_n$ is apparent from the statistical consideration that the larger the fraction of the component $n$ in the moving phase, the faster it will move through the system. The existence of a difference in relative velocities of the species at two temperatures can be seen in the log $Kv1/T$ plot shown in FIGURE 3 which is obtained in the practice of our invention.

Figure 4:
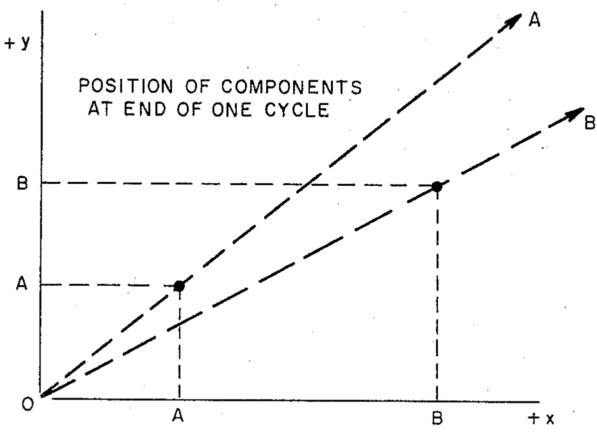
FIGURE 4 is a plot showing flow differences of two chemical species at different temperatures when the apparatus of FIG. 1 is employed.

Further, for the purpose of illustrating the practice of our invention, it is assumed that the movement of one chemical species is twice as fast as the other at $T_1$ and three times as fast as $T_2$. As shown in FIGURE 4 when the flow is in the direction +Y at 1, component B will go twice as far as component A. After the first time interval the direction of flow is changed to +X and the temperature of the bed material is changed simultaneously to $T_2$. In a similar period of time, B will go three times further than A (as shown). B drawing the resultant vector, the paths of the two chemical species are shown to separate. After a number of hours of pulse operation, the separated components will thus evolve as two different product streams as shown in FIG. 5.

Figure 5:
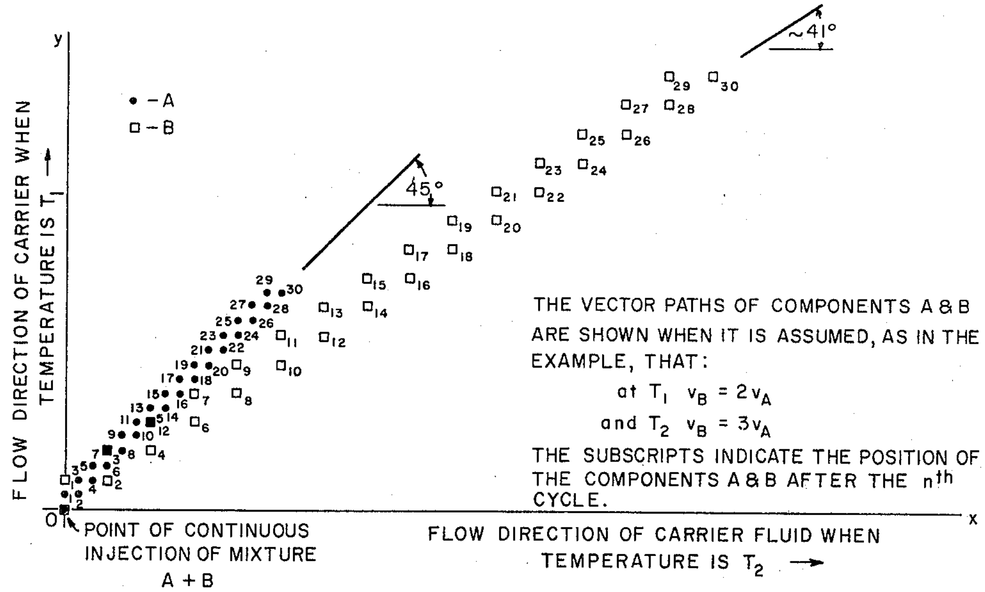
FIGURE 5 is a graphic illustration of the separation of components utilizing the apparatus shown in FIG. 1.

FIGURE 5 graphically illustrates the separation of a mixture of components as they flow through our novel apparatus. When the components reach either the north wall (2) or east wall (4) of our novel apparatus, they will leave the bed and enter separate plenum chambers 24 and thus a continuous, efficient and economical separation of the materials is effectuated.

We claim:

1. An apparatus capable of continuously separating the chemical components of a mixture of chemical species by a chromatographic technique comprising, a slab shaped chamber filled with particulate chromatographic adsorption material having a first axis and a second axis substantially larger than the third axis of the chamber, means for effectuating individual sequential laminar carrier fluid flows through said chamber along the first and second axes thereof without removing the adsorbent material therefrom, means for introducing a mixture containing at least two species, said species being capable of chromatographic separation, heating means operably connected to said chamber capable of regulating the temperatures of the adsorbent material, and means for selectively segregating specific portions of the carrier fluid as it exits from any point along the surface of the chamber so as to permit effective chromatographic separation of the species contained in the mixture.

2. An apparatus in accordance with claim 1 wherein said chromatographic adsorption material is composed of particles of aluminum oxide.

3. An apparatus in accordance with claim 2 wherein the heating means is composed of heating coils immersed in the chromatographic bed.

References Cited

UNITED STATES PATENTS

| | | | |
|---|---|---|---|
| 3,078,647 | 2/1963 | Mosier | 55—197 |
| 3,417,548 | 12/1968 | Thompson | 55—67 |

JAMES L. DECESARE, Primary Examiner